United States Patent
Choset et al.

(10) Patent No.: US 9,796,082 B2
(45) Date of Patent: Oct. 24, 2017

(54) SERIES ELASTIC ACTUATORS FOR ROBOTS AND ROBOTIC DEVICES

(71) Applicant: Carnegie Mellon University, Center for Technology Transfer & Enterprise, Pittsburgh, PA (US)

(72) Inventors: Howie Choset, Pittsburgh, PA (US); David Rollinson, Pittsburgh, PA (US); Steven Ford, Glastonbury, CT (US); H. Ben Brown, Pittsburgh, PA (US)

(73) Assignee: Carnegie Mellon University, CTTEC, Pittsburgh, PA (US)

( * ) Notice: Subject to any disclaimer, the term of this patent is extended or adjusted under 35 U.S.C. 154(b) by 207 days.

(21) Appl. No.: 14/286,316

(22) Filed: May 23, 2014

(65) Prior Publication Data

US 2015/0283698 A1    Oct. 8, 2015

Related U.S. Application Data

(60) Provisional application No. 61/855,828, filed on May 24, 2013.

(51) Int. Cl.
*B25J 17/00* (2006.01)
*B25J 17/02* (2006.01)
(Continued)

(52) U.S. Cl.
CPC ............ *B25J 9/12* (2013.01); *B25J 9/065* (2013.01); *B25J 19/068* (2013.01); *F16F 1/00* (2013.01);
(Continued)

(58) Field of Classification Search
CPC ... B25J 19/068; B25J 9/065; B25J 9/12; B25J 17/0208; B25J 13/085; B25J 9/1633;
(Continued)

(56) References Cited

U.S. PATENT DOCUMENTS 4,494,738 A * 1/1985 Britton .................. E02B 17/003
267/140
4,606,667 A    8/1986 Bailey
(Continued)

FOREIGN PATENT DOCUMENTS

WO    2012/123552 A1    9/2012

OTHER PUBLICATIONS

Chirikjian, Gregory, Burdick, Joel; The Kinematics of Hyper-Redundant Robot Locomotion; IEEE Transactions on Robotics and Automation, 11(6); pp. 781-793; 1995.
(Continued)

*Primary Examiner* — William Kelleher
*Assistant Examiner* — Jake Cook
(74) *Attorney, Agent, or Firm* — Jones Day

(57) ABSTRACT

An example actuator is provided to be used in robots and robotic devices. The actuator includes: a first plate, a second plate, and an elastic element disposed between the first plate and the second plate and including a center portion and an edge portion, the center portion corresponding to a first thickness and the edge portion corresponding to a second thickness larger than the first thickness, a first shear stress associated with the center portion being approximately equal to a second shear stress associated with the edge portion.

21 Claims, 17 Drawing Sheets

(51) Int. Cl.
| | |
|---|---|
| B25J 18/00 | (2006.01) |
| B25J 9/12 | (2006.01) |
| F16F 1/00 | (2006.01) |
| B25J 9/06 | (2006.01) |
| H02K 7/00 | (2006.01) |
| B25J 19/06 | (2006.01) |
| H02P 21/20 | (2016.01) |

(52) U.S. Cl.
CPC ............. *H02K 7/003* (2013.01); *H02P 21/20* (2016.02); *Y10S 901/23* (2013.01); *Y10T 74/20317* (2015.01)

(58) Field of Classification Search
CPC ...... B25J 9/1641; B25J 9/1694; B25J 9/1669; B25J 9/1653; B25J 9/1628; H02K 11/24; H02K 11/27; H02K 7/003; H02K 11/25; F16F 1/505
See application file for complete search history.

(56) References Cited

U.S. PATENT DOCUMENTS

| | | | | |
|---|---|---|---|---|
| 4,928,030 | A | | 5/1990 | Culp |
| 5,327,790 | A | * | 7/1994 | Levin ................. B25J 9/12 73/862.321 |
| 8,069,747 | B2 | | 12/2011 | Buckingham et al. |
| 2006/0048364 | A1 | * | 3/2006 | Zhang ............... B23Q 17/0966 29/407.08 |
| 2007/0143040 | A1 | * | 6/2007 | Ide .......................... G01M 1/10 702/41 |
| 2010/0234999 | A1 | * | 9/2010 | Nakajima ............. B25J 9/1628 700/261 |
| 2011/0204838 | A1 | * | 8/2011 | Nakasugi ............... B25J 9/1633 318/689 |
| 2012/0286629 | A1 | * | 11/2012 | Johnson ................... B25J 9/08 310/68 B |

OTHER PUBLICATIONS

Diftler, M.A., Mehling, J.S., Abdallah, M.E., Radford, N.A., Bridgwater, L.B., Sanders, A.M., Askew, R.S., Linn, D.M., Yamokoski, J.D., Permenter, F.A., Hargrave, B.K., Platt, R., Savely, R.T., Ambrose, R.O.; Robonaut 2—The First Humanoid Robot in Space; IEEE International Conference on Robotics and Automation; pp. 2178-2183; May 2011.

Gent, Alan; Engineering with Rubber: How to Design Rubber Components, 2d Edition; HanserGardner Publications, Inc.: Cincinnati, OH; 2001.

Hirose, Shigeo; Biologically Inspired Robots: Snake-Like Locomotors and Manipulators; Oxford University Press: New York, NY; 1993.

Hirose, Shigeo, Yamada, Hiroya; Snake-Like Robots: Machine Design of Biologically Inspired Robots; IEEE Robotics & Automation Magazine; pp. 88-98; Mar. 2009.

Hurst, Jonathan, Rizzi, Alfred, Hobbelen, Daan; Series Elastic Actuation: Potential and Pitfalls; International Conference on Climbing and Walking Robots; 2004.

Hurst, Jonathan; The Role and Implementation of Compliance in Legged Locomotion; PhD Thesis: Carnegie Mellon University; 2008.

Karlsson, Fredrik, Persson, Anders; Modelling Non-Linear Dynamics of Rubber Bushings: Parameter Identification and Validation; PhD Thesis: Lund University; 2003.

Kikuchi, Masaru, Aiken, Ian; An Analytical Hysteresis Model for Elastomeric Seismic Isolation Bearings; Earthquake Engineering and Structural Dynamics, 26(2); pp. 215-231; 1997.

Kong, Kyoungchul, Bae, Joonbum, Tomizuka, Masayoshi; A Compact Rotary Series Elastic Actuator for Knee Joint Assistive System; IEEE International Conference on Robotics and Automation; pp. 2940-2945; May 2010.

Lee, Woojin; Designing Articulated Legs for Running Machines; PhD Thesis: Massachusetts Institute of Technology; 1990.

Pratt, Gill, Williamson, Matthew; Series Elastic Actuators; Proceedings of the IEEE/RSJ International Conference on Intelligent Robots and Systems; pp. 399-406; 1995.

Robinson, David, Pratt, Jerry, Paluska, Daniel, Pratt, Gill; Series Elastic Actuator Development for a Biomimetic Walking Robot; IEEE/ASME International Conference on Advanced Intelligent Mechatronics; 1999.

Seyfarth, Andre, Geyer, Hartmut, Lipfert, Susanne, Rummel, Juergen, Minekawa, Yohei, Iida, Fumiya; Running and Walking with Compliant Legs; Lecture Notes in Control and Information Sciences: Fast Motions in Biomechanics and Robotics, 340; pp. 383-401; 2006.

Wright, Cornell, Buchan, Austin, Brown, Ben, Geist, Jason, Schwerin, Michael, Rollinson, David, Tesch, Matthew, Choset, Howie; Design and Architecture of the Unified Modular Snake Robot; IEEE International Conference on Robotics and Automation; pp. 4347-4354; May 2012.

Yim, Mark, Shen, Wei-Min, Salemi, Behnam, Rus, Daniela, Moll, Mark, Lipson, Hod, Klavins, Eric, Chirikjian, Gregory; Modular Self-Reconfigurable Robot Systems: Challenges and Opportunities for the Future; IEEE Robotics and Automation Magazine; pp. 43-52; Mar. 2007.

International Search Report and Written Opinion of the International Searching Authority; PCT/US2014/039383; dated Feb. 18, 2015.

* cited by examiner

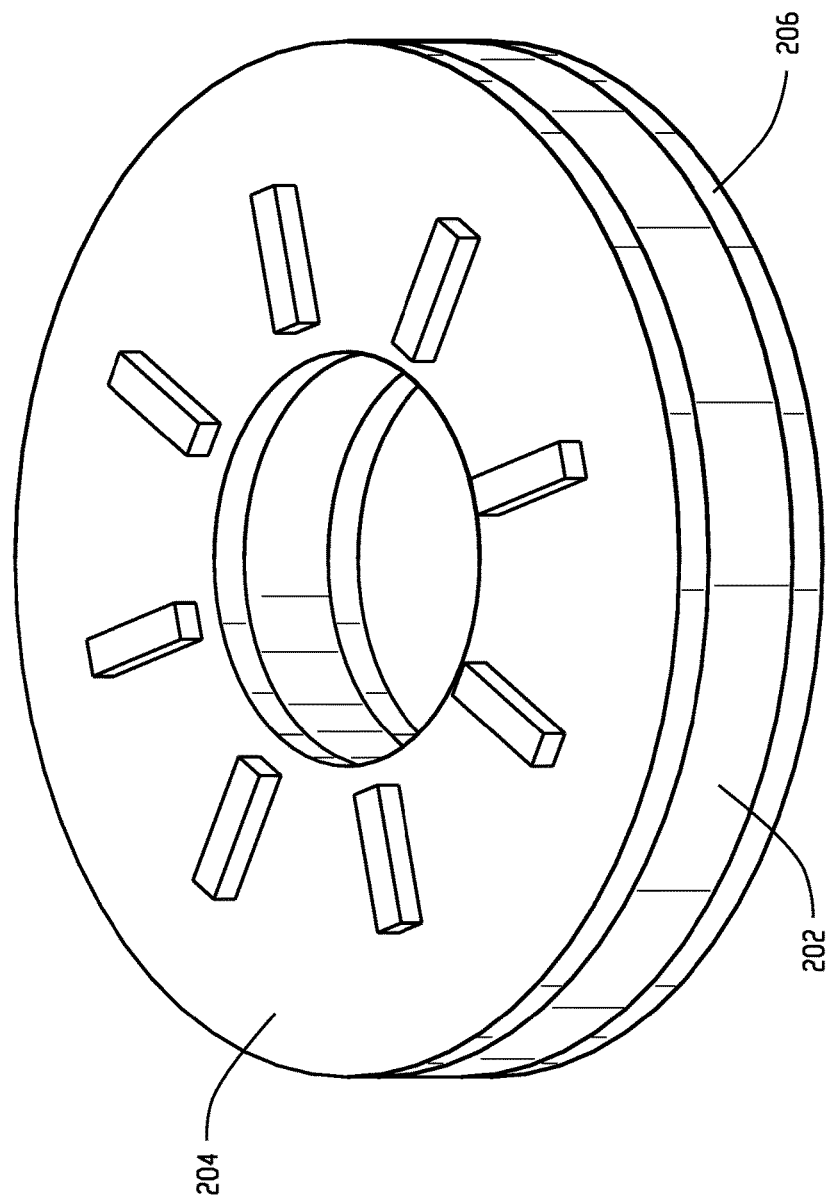

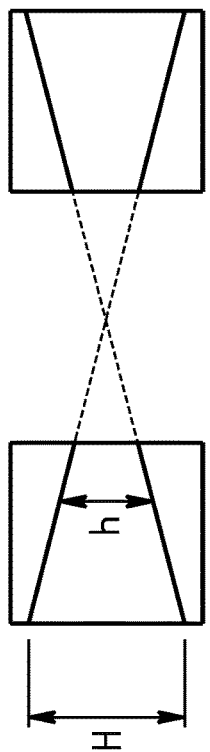
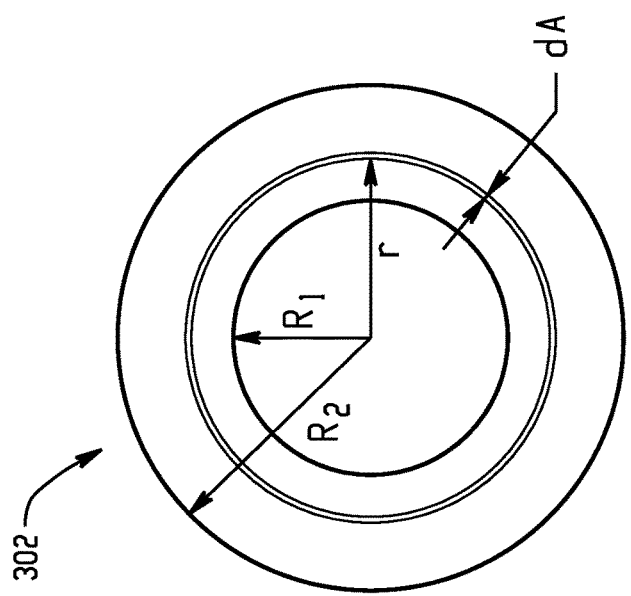
Fig. 3(b)
Fig. 3(a)

US 9,796,082 B2

SERIES ELASTIC ACTUATORS FOR ROBOTS AND ROBOTIC DEVICES

CROSS-REFERENCE TO RELATED APPLICATIONS

This disclosure claims priority to and benefit from U.S. Provisional Patent Application No. 61/855,828, filed on May 24, 2013, the entirety of which is incorporated herein by reference.

GOVERNMENT RIGHTS

This invention was made with government support under Contract No.: W911NF1110061 awarded by the Defense Advanced Research Projects Agency (DARPA). The government has certain rights in this invention.

BACKGROUND

A robot (or a robotic device) usually corresponds to an electro-mechanical machine that is often guided by a computer program or electronic circuitry to perform motions. Oftentimes, an actuator (e.g., an electric motor) is used in a robot or a robotic device for position control, velocity control, and/or torque control.

SUMMARY

In accordance with the teachings described herein, an example actuator is provided to be used in robots and robotic devices. The actuator includes: a first plate, a second plate, and an elastic element disposed between the first plate and the second plate and including a center portion and an edge portion. The center portion corresponds to a first thickness and the edge portion corresponds to a second thickness larger than the first thickness. A first shear stress associated with the center portion is approximately equal to a second shear stress associated with the edge portion.

As an example, a device includes: a first component including a first actuator; and a second component connected to the first component. The first actuator includes a first elastic element. The first elastic element includes a first center portion and a first edge portion, the first center portion corresponding to a first thickness and the first edge portion corresponding to a second thickness larger than the first thickness, a first shear stress associated with the first center portion being approximately equal to a second shear stress associated with the first edge portion.

As another example, a robot includes: a plurality of modules connected in series and including one or more actuators. The actuators are configured to receive a current for generating a torque for motion of the modules. The actuators include an elastic element. The elastic element includes a center portion and an edge portion, the center portion corresponding to a first thickness and the edge portion corresponding to a second thickness larger than the first thickness, a first shear stress associated with the center portion being approximately equal to a second shear stress associated with the edge portion.

BRIEF DESCRIPTION OF THE DRAWINGS

FIG. 1 depicts an example diagram showing an elastic element as part of an actuator.

FIG. 3(a) and FIG. 3(b) depict example diagrams showing a top view and a cross-section view of an elastic element respectively.

DETAILED DESCRIPTION

Actuators used in a robot or a robotic device are often stiff, which makes it difficult to sense and comply to contact with the environment. Force and torque sensors can be used to provide necessary information regarding actuator functionality, but such sensors are often hard to integrate into a compact robot or a compact robotic device. This disclosure provides an actuator that includes an elastic element (e.g., for torque sensing) and can be used for any applications in the robotic field, such as a robot or a robotic device.

FIG. 1 depicts an example diagram showing an elastic element that can be integrated into a robotics application as part of an actuator. As shown in FIG. 1, the elastic element 202 is disposed between two plates 204 and 206. In one example, the elastic element 202 includes a rubber-based material, where the specific energy (e.g., energy per unit mass) of the rubber-based material is 5200 J/kg. In some embodiments, the elastic element 202 is a latex sheet that is glued (e.g., using cyanoacrylate adhesive) to the plates 204 and 206 (e.g., acrylic plates). In one embodiment, the elastic element 202 is about 38 mm (1.5 in) in diameter and about 10 mm (0.4 in) thick.

Figure 2B:
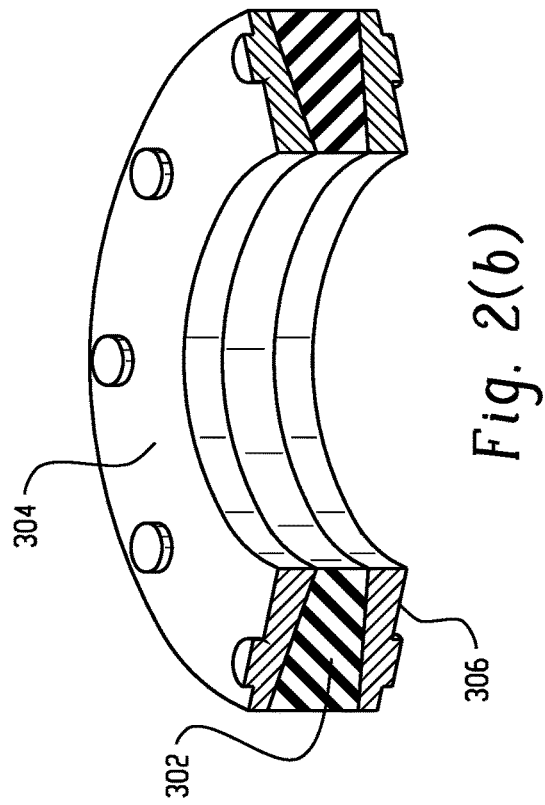
FIG. 2(a) and FIG. 2(b) depict example diagrams showing another elastic element and a cross-section of the elastic element respectively.
Figure 2A:
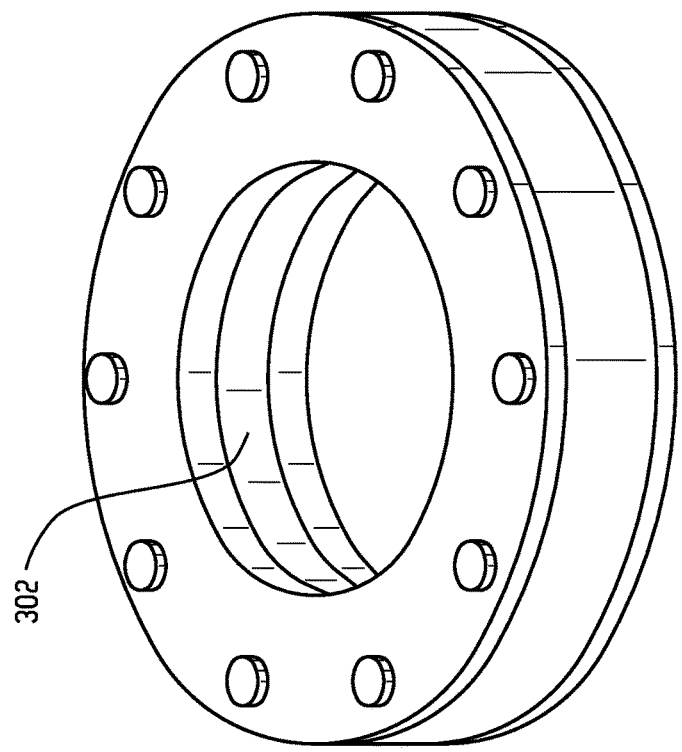

FIG. 2(a) and FIG. 2(b) depict example diagrams showing another elastic element and a cross-section of the elastic element, respectively. The elastic element 302 includes a spring material (e.g., neoprene or natural rubber) which is configured to be sheared torsionally about the elastic element's central axis. The elastic element 302 is disposed between a top plate 304 and a bottom plate 306, as shown in FIG. 2(b).

In some embodiments, the elastic element 302 is about 25 mm (0.95 in) in diameter, about 5 mm (0.19 in) thick, and weights under 5 grams. The plates 304 and 306 can be designed with a circular pattern of posts that enable the elastic element 302 to be integrated into a gear stage (e.g., a final gear stage) of a robotic module. The elastic element 302 is molded to the plates 304 and 306, which are fabricated, e.g., from cold-rolled steel bar. To enhance bonding of the rubber-based material in the elastic element 302, surfaces of the plates 304 and 306 may be treated with a microcrystalline calcium modified zinc phosphate coating.

In certain embodiments, the rubber-based material (e.g., 40-50 durometer natural rubber or neoprene) may be compression molded at 150° C. Specifically, the process of bonding the rubber-based material to the plates 304 and 306 is preceded by an aerosol spraying of a primer and a top coating to the clean surfaces of the plates 304 and 306. A period of time (e.g., 24 hours) is allowed to elapse between applying the primer and molding. The plates 304 and 306 are then inserted into the mold (e.g., at 150° C.) with approximately 4.5 grams of the rubber-based material. The process of molding lasts about 490 seconds for the elastic element 302, where a cool-down process follows.

FIG. 3(a) and FIG. 3(b) depict example diagrams showing a top view and a cross-section view of the elastic element 302, respectively. As shown in FIG. 3(b), the cross-section of the elastic element 302 corresponds to a conical taper spring that intersects at a center of the elastic element. Compared to flat cross-section springs, which have a maximum shear stress at an outer edge of the spring, the elastic element 302 with the conical taper cross-section generates approximately uniform shear stress across the entirety of the elastic element 302, which can result in significantly increased strength of the elastic element 302.

The amount by which the conical taper design increases the stiffness and strength of the elastic element 302 can be calculated by integrating an internal shear force of the elastic element 302. A torque $\tau$ generated by the elastic element 302 is a function of a shear stress $\sigma$ integrated over differential rings dA of radius $\gamma$:

$$\tau(\gamma) = \int \gamma \sigma(\gamma) dA \quad (1)$$

$$dA = 2\pi \gamma d\gamma \quad (2)$$

The shear stress in the elastic element 302 (e.g., rubber) is proportional to the shear strain $\epsilon$:

$$\sigma(\gamma) \propto \epsilon \quad (3)$$

Assuming small shear angles, the shear stress $\sigma$ becomes a linear function of a rotational displacement $\theta$ of the elastic element 302, the distance $\gamma$ from the center of the elastic element 302, and the thickness h of the elastic element 302:

$$\varepsilon \approx \tan(\varepsilon) = \frac{\theta \gamma}{h} \quad (4)$$

$$\sigma(\gamma) \propto \frac{\theta \gamma}{h} \quad (5)$$

The elastic element 302 includes a conical taper cross-section, and the thickness of the elastic element 302 increases linearly with increasing radius. For example, the thickness of an edge portion of the elastic element 302 is larger than the thickness of a center portion of the elastic element 302.

$$h = H \frac{\gamma}{R} \quad (6)$$

R represents an outer radius of the elastic element 302, and H represents a constant.

According to Equations 1-6, the torque generated by the elastic element 302 is determined as follows:

$$\tau(\gamma) \propto \int_r^R \frac{2\pi R \theta \gamma^2}{H} d\gamma \quad (7)$$

$$\tau(\gamma) \propto \frac{2\pi R \theta \gamma^3}{3H} \bigg|_r^R \quad (8)$$

where r represents an inner radius of the elastic element 302.

A torque generated by a spring with a flat cross-section can be estimated as follows:

$$\tau(\gamma) \propto \frac{\pi \theta \gamma^4}{2H} \bigg|_r^R \quad (9)$$

Thus, a torque ratio $\beta$ is estimated between the torque generated by a spring with a flat cross-section and the torque generated by the elastic element 302 with a conical taper cross-section.

$$\beta = \frac{4(R^4 - Rr^3)}{3(R^4 - r^4)} \quad (10)$$

The torque ratio $\beta$ is greater than 1 for all r<R.

Figure 4:
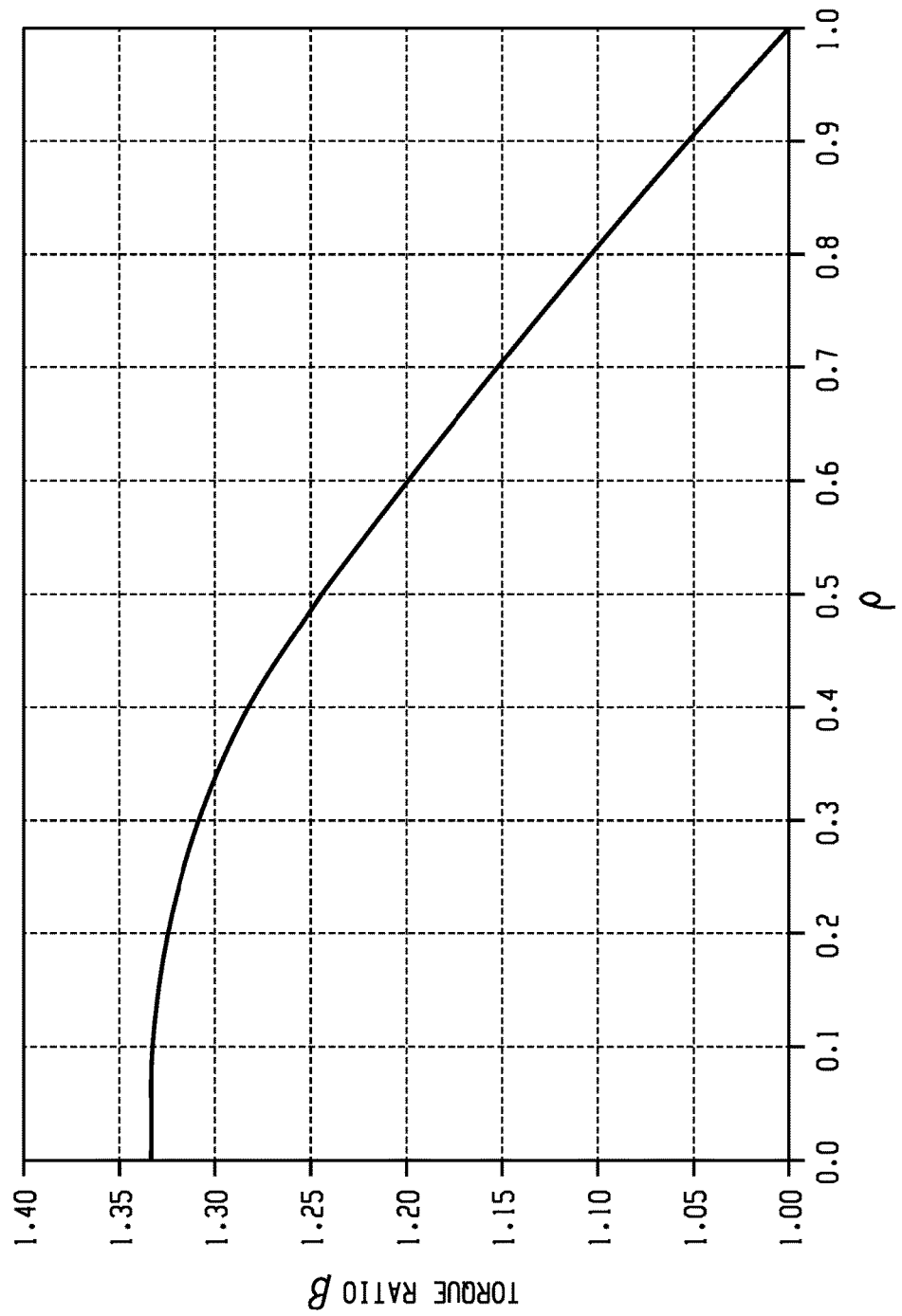
FIG. 4 depicts an example diagram showing a plot of a torque ratio as a function of a ratio of the inner radius and the outer radius.

FIG. 4 depicts an example diagram showing a plot of a torque ratio as a function of a ratio of the inner radius and the outer radius. Referring to FIG. 3(a), the ratio of the inner radius and the outer radius of the elastic element in one implementation is about 0.6. As shown in FIG. 4, for that implementation, an improvement in ultimate load of 20% can be achieved by using the elastic element 302 with a tapered conical cross-section instead of a spring with a flat cross-section.

Figure 5:
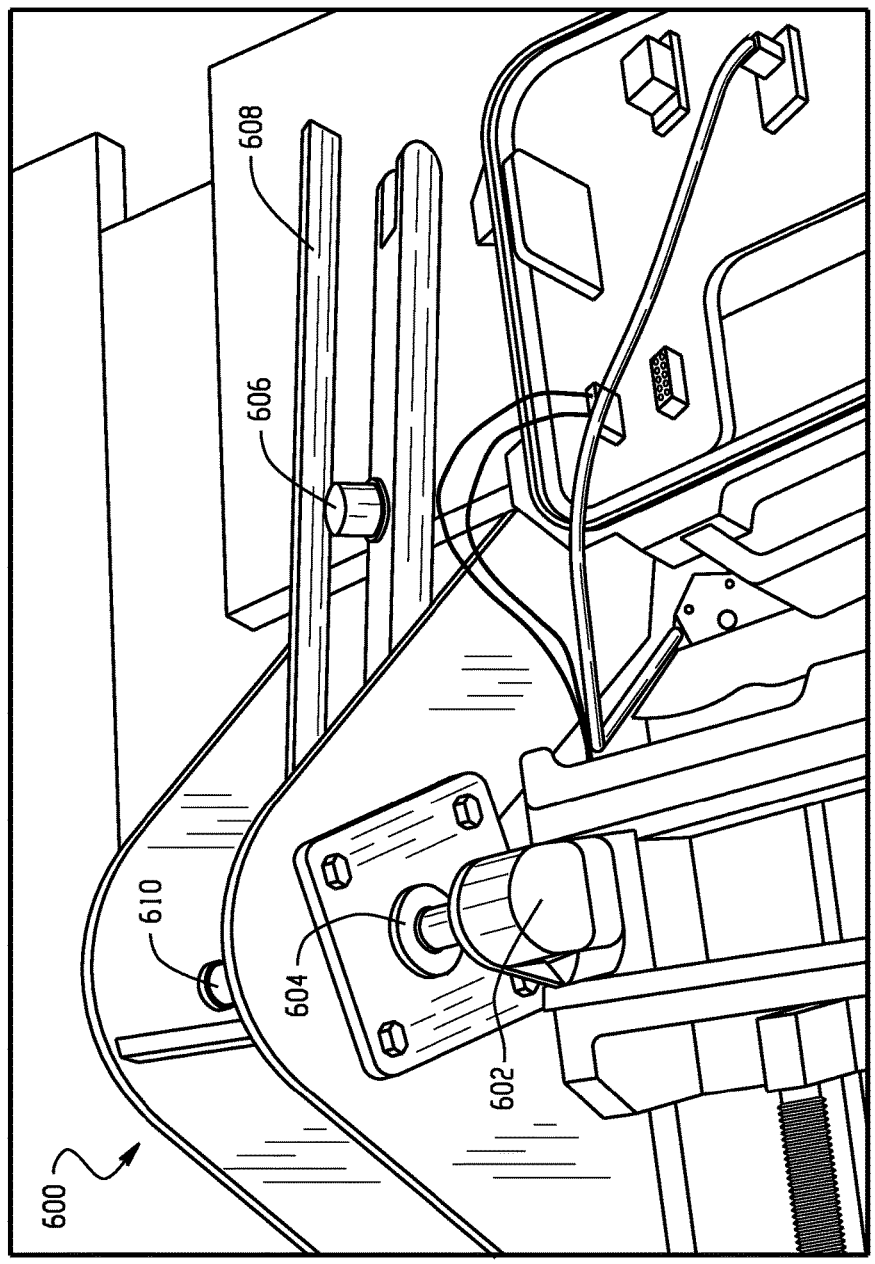
FIG. 5 depicts an example diagram showing a torque-sensing test rig.

FIG. 5 depicts an example diagram showing a torque-sensing test rig for testing parameters of different elastic element implementations. The rig 600 can be used to determine ultimate strength of elastic elements made with different designs and from different spring materials. In addition, the linearity of the elastic elements can characterized, and hysteresis and other nonlinear effects of the torque-displacement curves can be modeled. As shown in FIG. 5, a robotic module that includes an elastic element (e.g., spring) is placed on the rig 600 for testing.

In one test of elastic element implementations, elastic elements made with three different rubbers, 40 A durometer neoprene, 40 A durometer natural rubber, and 50 A durometer natural rubber, were tested. Linear spring constants were fit to torque displacement data for the elastic elements after the elastic elements are initially load cycled. Resulting fitted spring constants and example average errors are listed below in Table 1.

TABLE 1

|  | Neoprene 40A | Natural rubber 40A | Natural rubber 50A |
|---|---|---|---|
| Linear model error | 8.9% | 9.1% | 5.5% |
| Hysteresis model error | 5.1% | 8.6% | 2.6% |
| Spring constant (N-m/°) | 0.055 | 0.059 | 0.101 |
| Spring constant (ft-lbs/°) | 0.041 | 0.043 | 0.075 |

Figure 6:
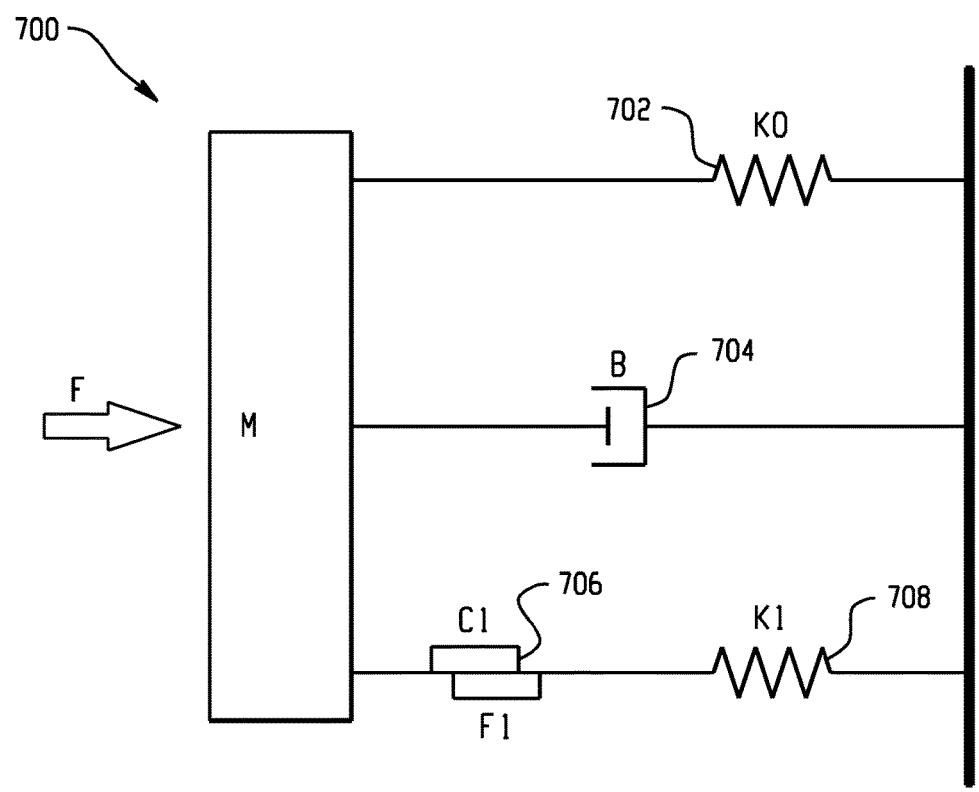
FIG. 6 depicts an example diagram showing a physical model for modeling hysteresis.

FIG. 6 depicts an example diagram showing a physical model for modeling hysteresis of an elastic element based on the testing discussed above with reference to FIG. 5. As shown in FIG. 6, the physical model 700 includes a linear spring 702, a linear damper 704, and a frictional element 706 with a series spring 708. The model 700 generalizes to rotation motion. To determine parameters of an elastic element, the mass (M) in the model 700 is set to zero. Each of the linear spring 702, the linear damper 704, the frictional element 706 and the series spring 708 coefficients are fit by optimizing the average squared error of a predicted model torque compared with the actual spring torques measured by the test rig 600 above with reference to FIG. 5.

Figure 7:
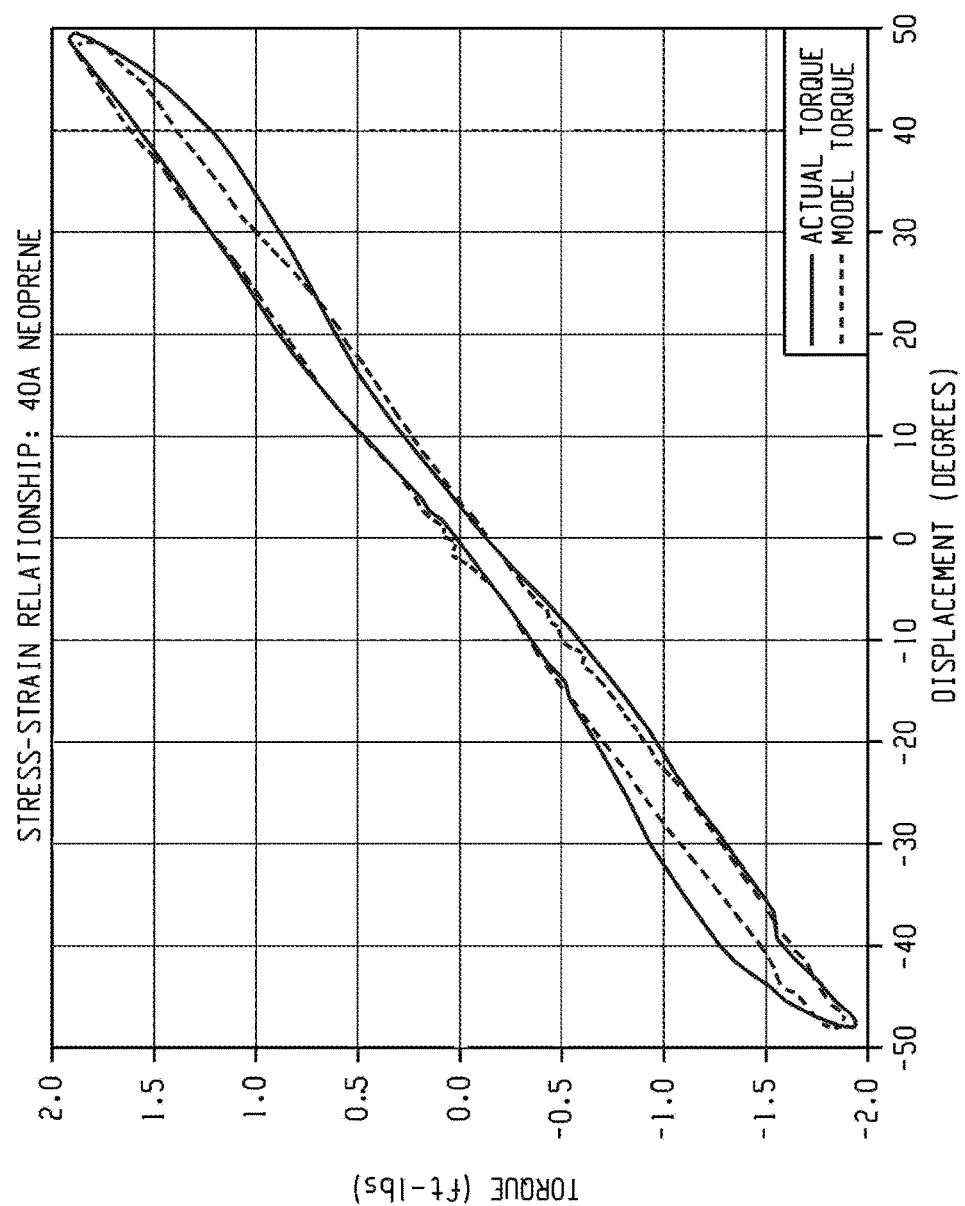
FIG. 7 shows an example predicted torque displacement curve from a model along with an example torque-displacement curve for an elastic element made from neoprene.

For example, Matlab's fminsearch optimizer can be used to fit the parameters. There are 5 parameters in the model 700: K0, the main spring coefficient, B, the viscous damping coefficient, C1, the coefficient of friction of the frictional element 706, F1, the yield force of the frictional element 706, and K1, the series spring coefficient of the frictional element 706. FIG. 7 shows an example predicted torque displacement curve from the model 700 along with an example torque-displacement curve for an elastic element made from 40 A durometer neoprene.

In some embodiments, the elastic element 302 molded to the plates 304 and 306 is tested to failure and has a strength of approximately 8 N-m (6 ft-lbs) at approximately 90° of displacement. The energy stored in the elastic element 302 can be determined as follows:

$$E = \frac{1}{2}k\theta^2 \quad (11)$$

where k represents a spring constant for the elastic element 302, and $\theta$ represents a deflection angle. For example, the elastic element 302 stores about 6 J of energy, if the elastic element 302 contains about 1.8 grams of rubber which has a specific energy density of about 3000 J/kg.

Additional parameters of an elastic element can also be ascertained via testing. For example, fatigue tests of the elastic element 302 can be run by installing the elastic element 302 into a final stage of a gear train of a robotic module. By locking the output hub of the module in place and commanding a 1 Hz sinusoidal oscillation, the elastic element 302 is subjected to repeated loading of approximately 2.6 N-m (2 ft-lbs). In one test, the elastic element 302 failed after approximately 10,000 cycles. In an additional test, the elastic element 302 may be heated up to determine a point where it begins to melt.

Figure 8A:
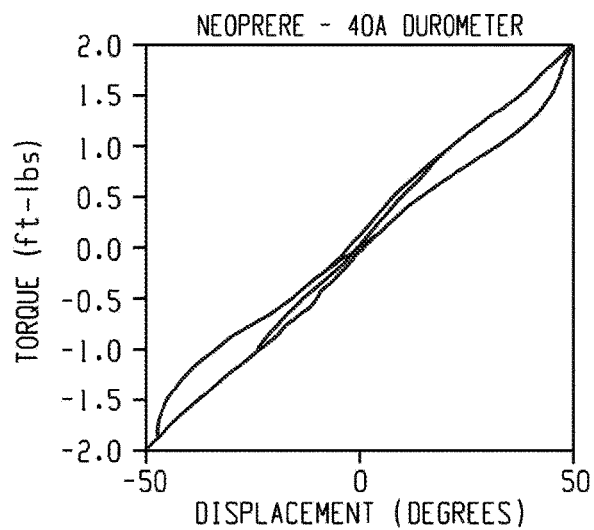
FIG. 8(a)-FIG. 8(c) depict example diagrams showing torque-displacement profiles for elastic elements made from different spring materials.
Figure 8B:
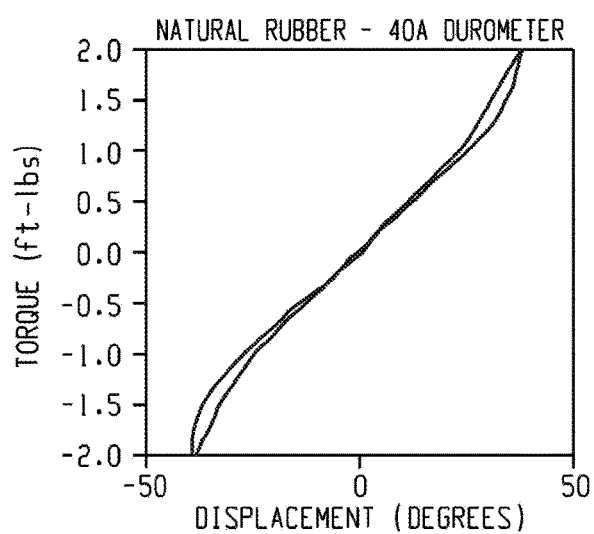
Figure 8C:
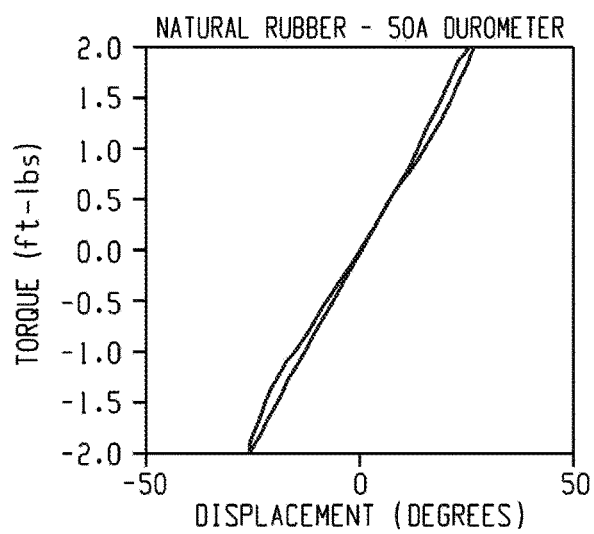

FIG. 8(a)-FIG. 8(c) depict example diagrams showing torque-displacement profiles for elastic elements made from different spring materials. As shown in FIG. 8(a)-FIG. 8(c), the neoprene shows the most hysteresis and the lowest stiffness. The natural rubber springs have significantly less hysteresis. For example, all of the springs corresponding to the elastic elements are approximately linear over a +/−2 ft-lb (+/−2.6 N-m) torque range. The elastic elements are cycled 3 times in increasing torque from +/−0.7 N-m (0.5 ft-lbs) to +/−1.3 N-m (1 ft-lbs) to +/−2.6 N-m (2 ft-lbs).

Figure 9:
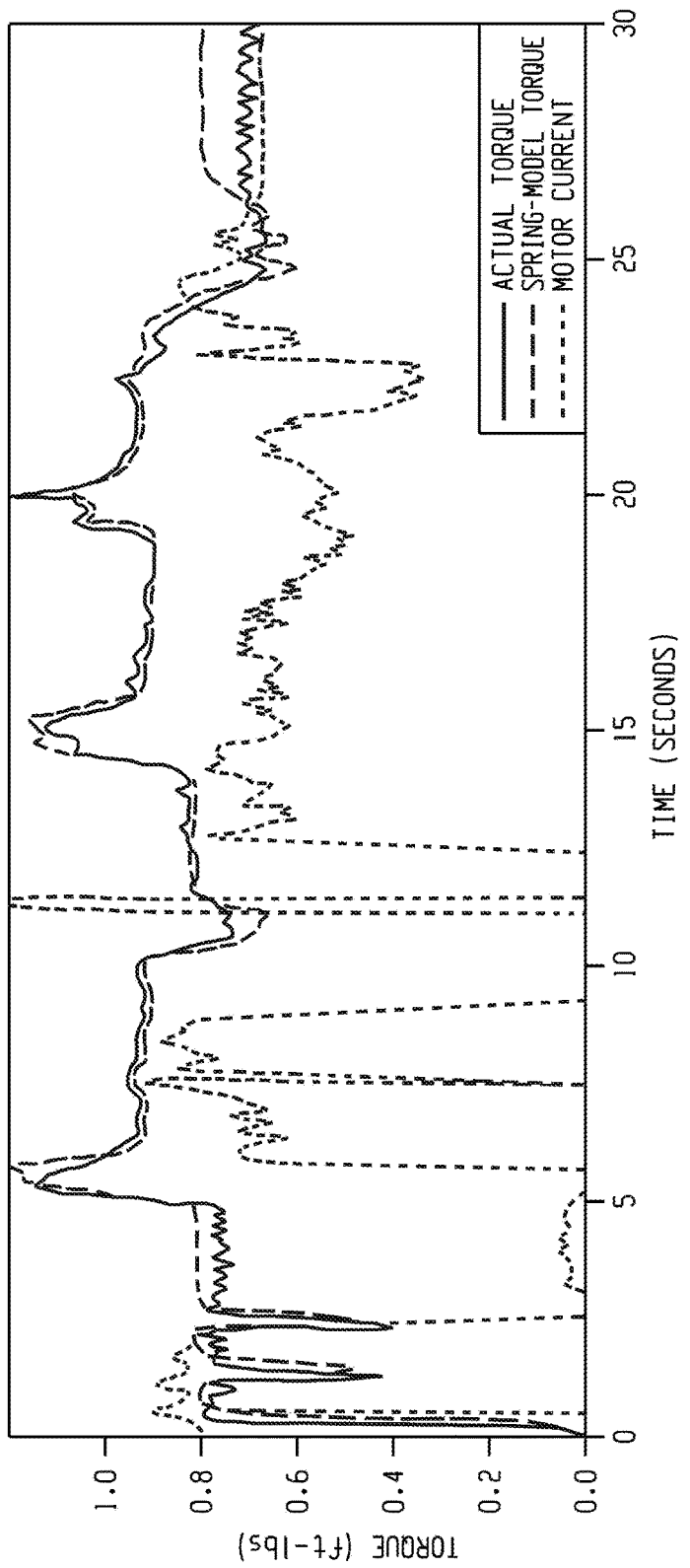
FIG. 9 depicts an example diagram showing estimated torques compared with an actual torque.

In one example, a torque controller is implemented using a robotic module. An elastic element that includes a 40 durometer natural rubber series elastic element is molded to two metal plates (e.g., similar to the elastic element 302). To testing rig of FIG. 5 is used to analyze the configuration, where the module 602 and the elastic element 604 are attached to the test rig 600 that measures the output torque of the module 602 and the absolute displacement of the elastic element 604. The torque is measured with a load cell 606 attached to a lever arm 608 that can be pivoted by hand. The module 602 is commanded to exert a constant torque of 1.3 N-m (1 ft-lb), based on the deflection of the elastic element 604 and a linear spring constant while the angular position of the output hub is manually moved around. The position of the lever arm 608 is varied by hand. A feedback loop on estimated torque runs at approximately 17 Hz. The results of the test are shown in FIG. 9. The estimated torque based on the deflection of the elastic element 604 is accurate. As shown in FIG. 9, a simple linear model of the deflection of the elastic element 604 more accurately predicts an actual torque than a motor-current-based model.

Figure 10A:
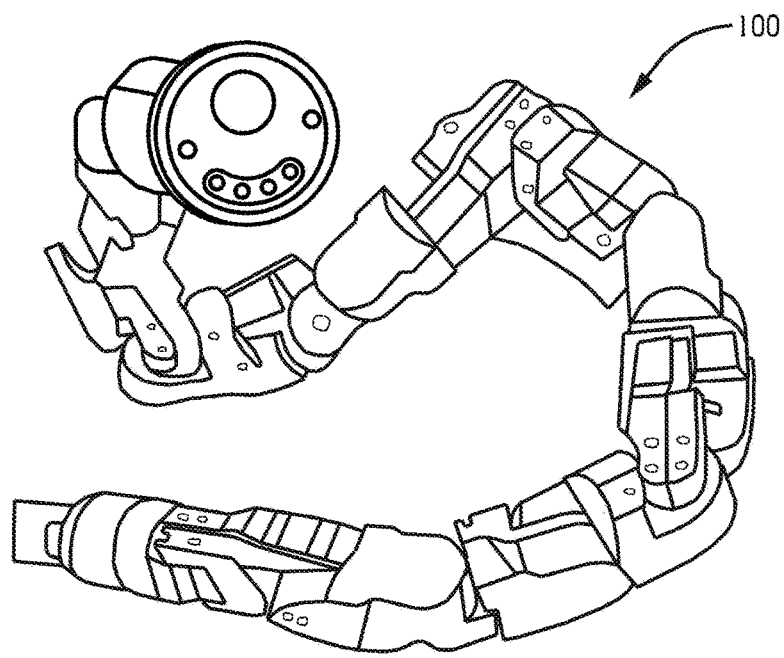
FIG. 10(a) and FIG. 10(b) depict example diagrams for a snake robot that implements an actuator including an elastic element.
Figure 10B:
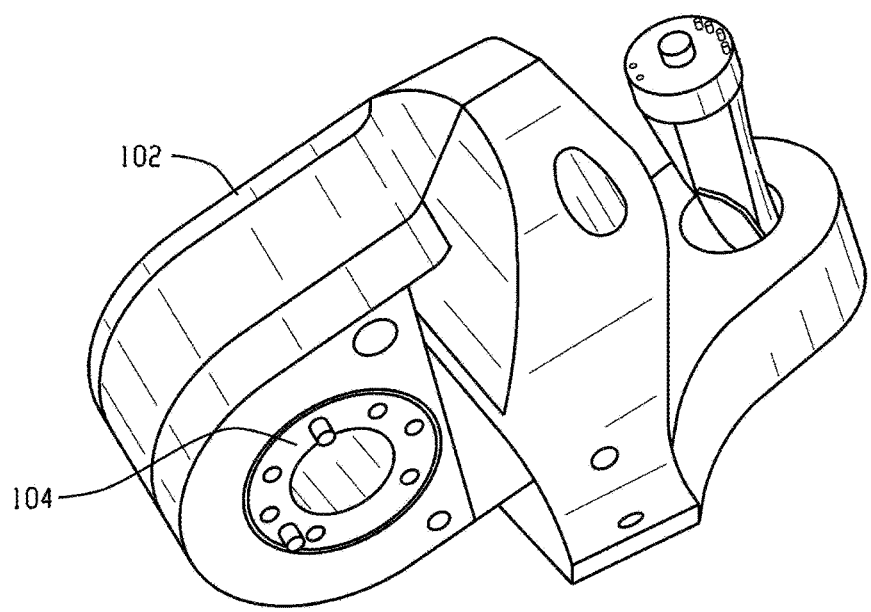

FIG. 10(a) and FIG. 10(b) depict example diagrams for a snake robot that illustrates one implementation of an actuator that includes an elastic element, as disclosed herein. As shown in FIG. 10(a), the snake robot 100 includes a plurality of components connected in series. An actuator 104 included in each component (e.g., a module 102) contains an elastic element for actuator compliance, force control, and output torque estimation. In one embodiment, an outer diameter of the snake robot 100 is about 50 mm (2 in). Each component (e.g., a module 102) weighs about 160 grams and can exert over 2.7 N-m (2 ft-lbs) of peak torque. FIG. 10(a) and FIG. 10(b) are merely examples, which should not unduly limit the scope of the invention. The actuator 104 can be implemented in any applications of the robotic field, including applications other than a snake robot.

Figure 11:
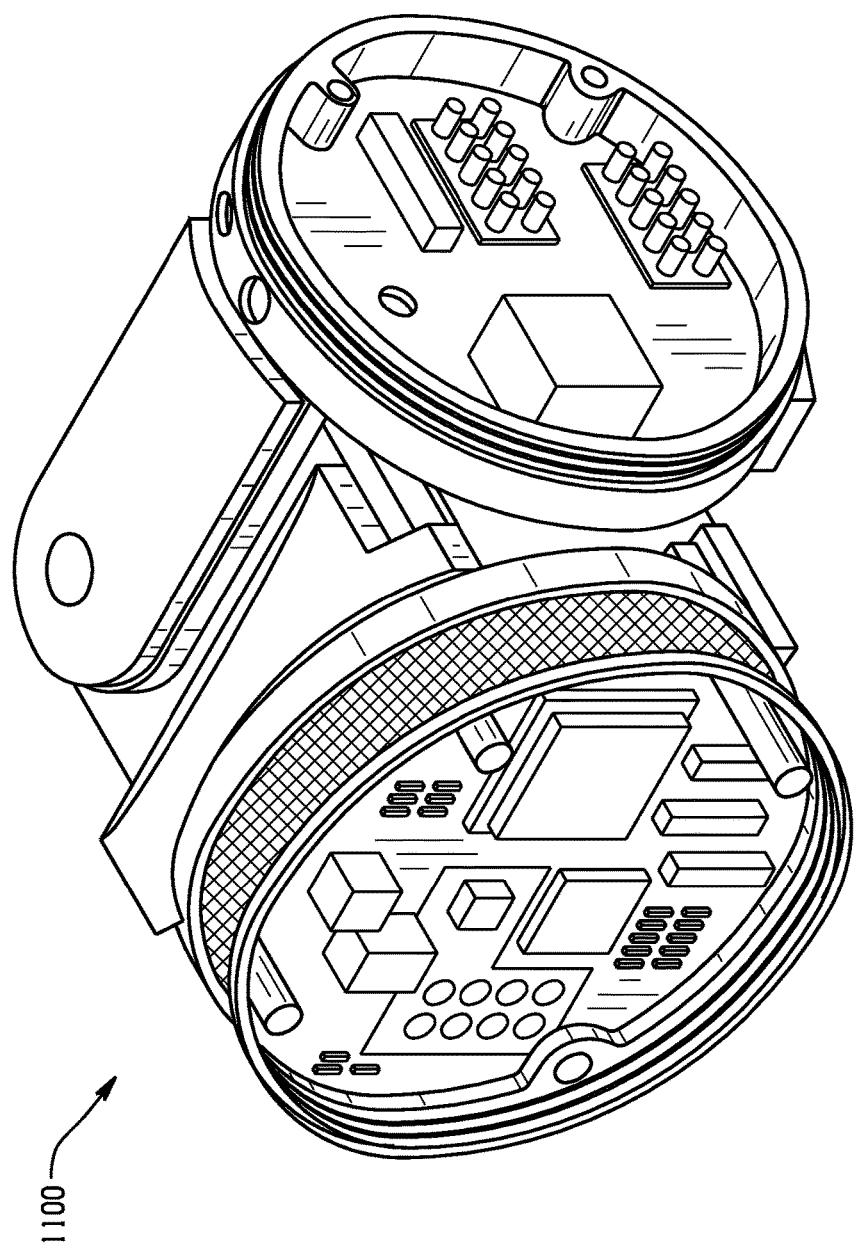
FIG. 11 depicts an example diagram showing a robotic module.

In one embodiment of the disclosure, online calibration of a compact series elastic actuator installed in a robotic module for any applications in the robotic field is be performed. FIG. 11 depicts an example diagram showing a robotic module. The module 1100 is about 5 cm (2 in) in diameter. The module 1100 has one degree of freedom (e.g., with rotary motion of +/−90°) actuated by a brushless direct-current motor connected to a custom spur gear train with gear ratio of 349:1. Further, the module 1100 includes a series elastic actuator that contains an elastic element (e.g., made of rubber-based materials) can output over 6 N-m of torque.

Figure 12:
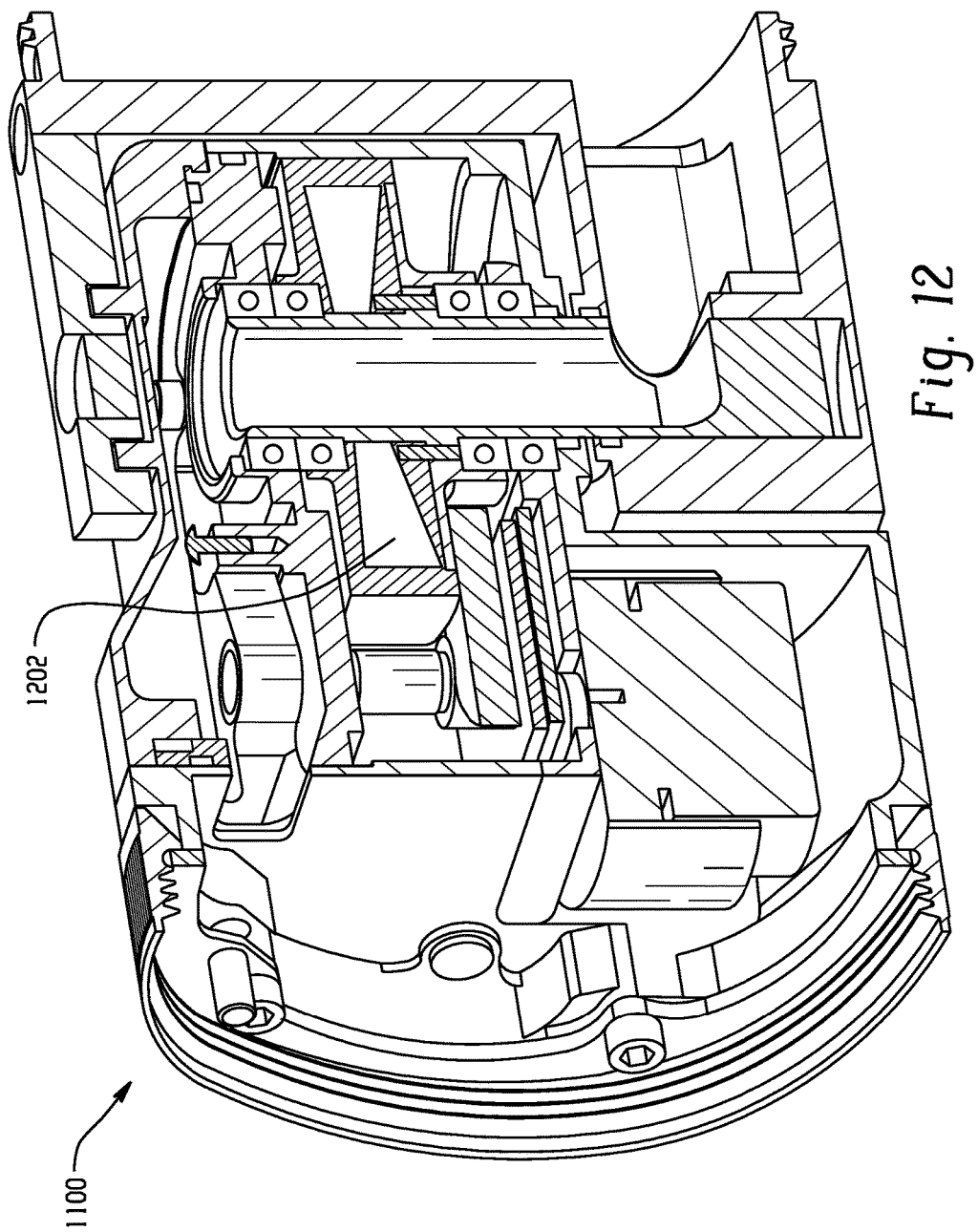
FIG. 12 depicts an example diagram showing a cross-section of the module as shown in FIG. 11.

FIG. 12 depicts an example diagram showing a cross-section of the module as shown in FIG. 11. As shown in FIG. 12, an elastic element 1202 that has a conical taper cross-section is embedded in a final stage of a gear train of the module 1100 (e.g., circled area). The elastic element 1202 includes a conically shaped layer of rubber molded into the final stage. In some embodiments, the module 1100 includes two magnetic encoders (e.g., the encoder 610 as shown in FIG. 5) that measure the input and output angles of the elastic element 1202.

Calibration for the actuator is performed using one or more models (e.g., linear models, Norton/Thevenin damped models, Buc-Wen hysteresis models) of which certain parameters of the current state of the actuator can be determined, e.g., based on motor current and/or internal sensors (such as encoders and temperature sensors). For example, calibration for the actuator is performed by measuring a motor current of the actuator's highly geared motor and using a simple linear model for an estimated torque of the elastic element 1202. Particular operating conditions under which the motor current is an accurate estimator of the output torque are determined and incorporated into a recursive estimation technique (e.g., a recursive least squares technique, an unscented Kalman filter) for estimating a spring constant in real-time. The output torque of the module 1100 is thus estimated.

In one embodiment, output torque of the series elastic actuator is estimated based on a sensed spring deflection in the elastic element 1202, or based on the sensed electrical current drawing by the actuator's motor. One method for estimating the output torque is to assume the parameters of the elastic element 1202 are constant and construct a dynamic model. In that example, a linear model that follows the Hooke's Law is employed for estimating the output torque:

$$T_{spring} = k\theta \tag{12}$$

where $T_{spring}$ represents the output torque, $\theta$ represents an angular displacement of a spring associated with the elastic element 1202, and k represents a torsional stiffness.

An alternative method for estimating a joint torque is to measure the motor current of the actuator. A linear relationship between torque and current is employed to estimate the output torque:

$$T_{current}\left(\tau I + \ddot{\theta}\sum_{i=1}^{4} J_i r_i\right)\eta \tag{13}$$

where $\tau$ represents a torque constant of the actuator's motor, I represents the motor current, $J_i$ represents an inertia parameter at stage I of the gear train in the module 1100, $\ddot{\theta}$ represents the acceleration of an output shaft of the motor, and $\eta$ represents efficiency of the gear train.

To avoid the difficulties of modeling history-dependent spring constants, in one embodiment, spring parameters are estimated online using sensor data and an associated error model. Feedbacks related to the motor current are selectively observed in order to actively update the spring stiffness of the elastic element 1202. Under certain operating conditions, the motor current model accurately tracks the output torque. For example, the motor current is most accurate when the spring displacement of the elastic element 1202 and the rate of change of the spring displacement of the elastic element 1202 are in a same direction, and an output velocity exceeds a certain threshold.

Figure 13:
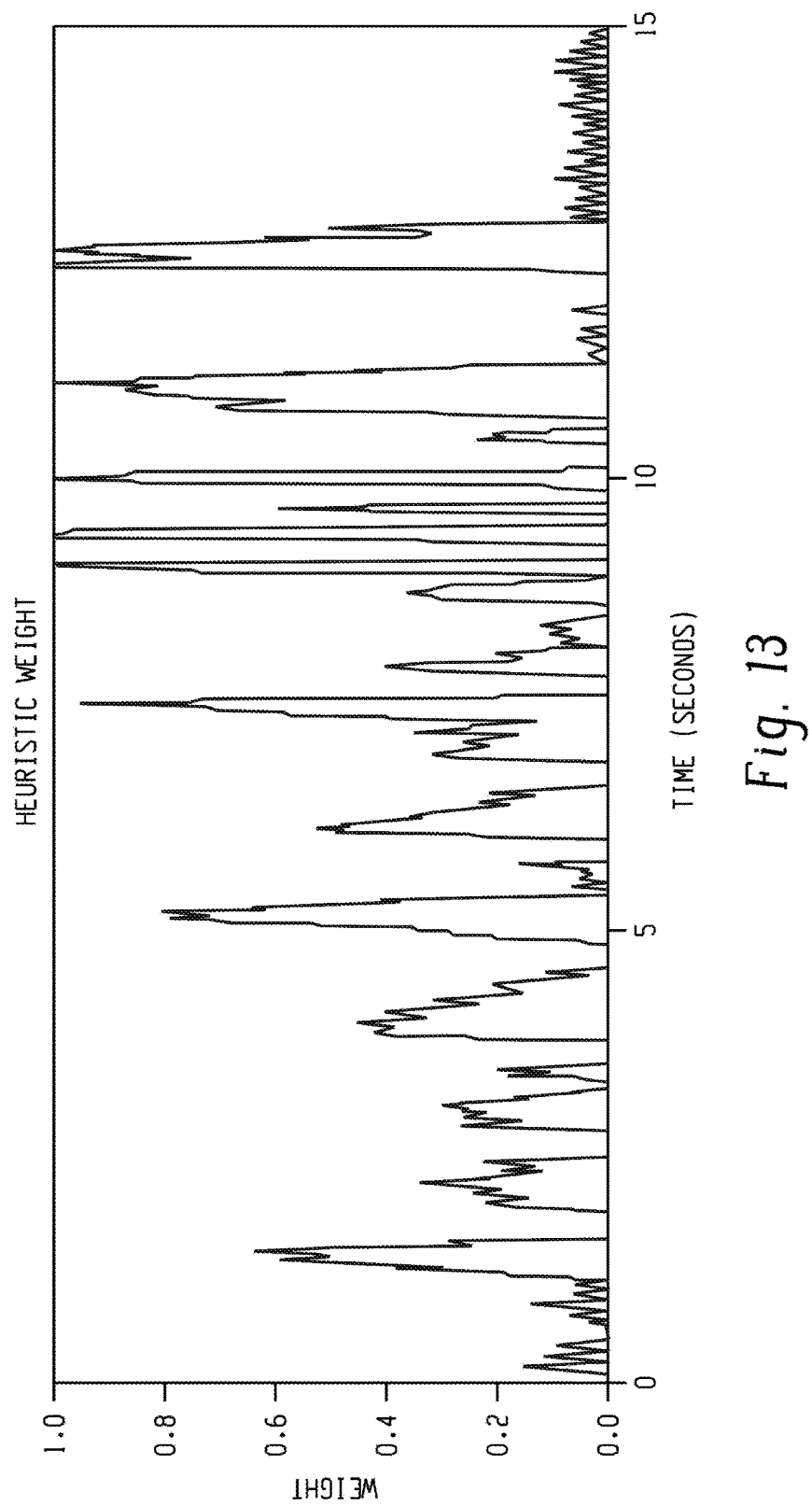
FIG. 13 depicts an example diagram showing the heuristic weight factor for motor current measurements.

In one embodiment, a heuristic weight factor is determined for describing confidence in a motor current measurement:

$$\varpi = \min\left(1, \max\left(0, \frac{\theta\dot{\theta}}{\gamma}\right)\right) \tag{14}$$

where $\varpi$ represents the weight factor, $\theta$ represents the spring displacement of the elastic element 1202, $\dot{\theta}$ represents the rate of change of the spring displacement of the elastic element 1202, and $\gamma$ represents a factor that adjusts scaling of the weight factor. For example, $\gamma$ is set to 20. Negative weights are discarded and large weights are kept no larger than 1. FIG. 13 depicts an example diagram showing the heuristic weight factor for motor current measurements. Motor current measurements corresponding to certain higher weights are used to estimate the output torque. In some embodiments, a control-loop error can be used instead of motor current measurements.

Any recursive least-squares techniques, non-linear optimizers, and/or formulations of models may be used for online calibration. For example, a spherical simplex unscented Kalman filter (SSUKF) is implemented for parameter estimation. The SSUKF operates recursively on a state vector x and a corresponding covariance matrix P. For estimating a single linear spring parameter, the state is simply x=k. The SSUKF also uses a process model for propagating the state estimate forward in time and a measurement model for generating measurements or observations based on the current state estimate:

$$x_t = f(x_{t-1}) \tag{15}$$

$$y_t = h(x_t) \tag{16}$$

The process model corresponds to a trivial stationary model:

$$\hat{k} = k_{t-1} \tag{17}$$

The measurement model of the SSUKF corresponds to an error function that compares the difference between the linear spring model (e.g., Equation 12) and the motor current model (e.g., Equation 13):

$$\epsilon = \overline{\omega}(T_{current} - T_{spring}) \tag{18}$$

The SSUKF is used to perform a single step of gradient descent on the unknown parameter with every iteration. More complex heuristics or cost functions are developed and worked into the framework of the SSUKF, which involves modifying the measurement function represented by Equation 16.

Additionally, if the SSUKF is run at a lower frequency than the measurements of the module 1100, where each step can be run on all the history since the last update.

$$\varepsilon = \sum_{i=t-n}^{t} \varpi_i \frac{(T_{current} - T_{spring})^2}{n} \tag{19}$$

The error function corresponds to a weighted average of the error between the linear spring model and the motor current model over the last n samples.

A Gaussian process and measurement noise associated with a Kalman filter serve as the tuning parameters. The relative weights of the parameter uncertainty compared to the measurement uncertainty affect the performance of the SSUKF. The process noise is denoted by a matrix Q and is added to the state covariance during a prediction step of the SSUKF. The magnitude of the process noise is scaled by the estimated spring stiffness $\hat{k}$.

$$Q = \alpha\hat{k} \tag{20}$$

The measurement noise, R, is set to a fixed value:

$$R = \beta \tag{21}$$

For example, $\alpha = 1 \times 10^{-4}$ and $\beta = 1$.

Figure 14:
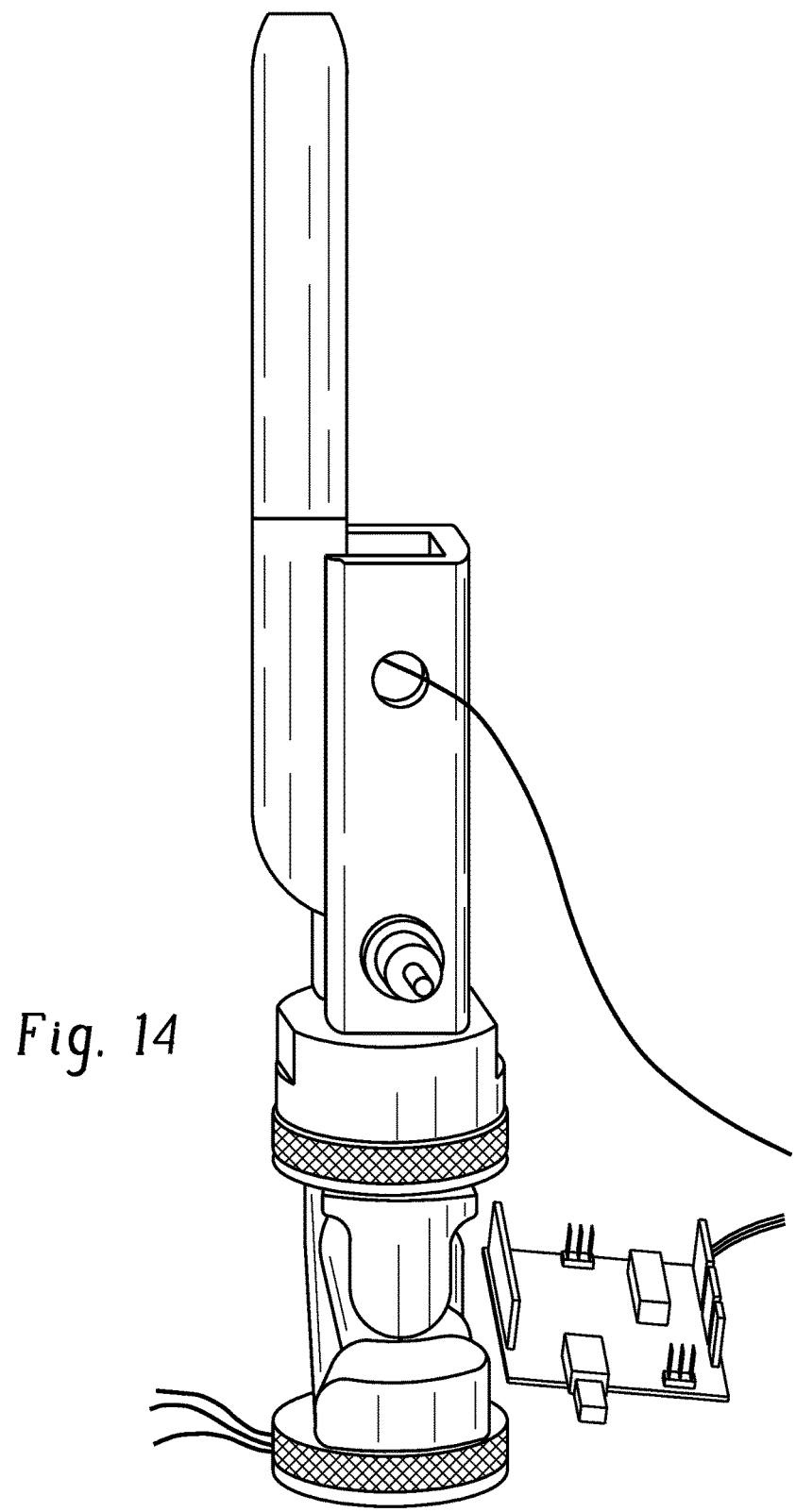
FIG. 14 depicts an example diagram showing a test rig for measuring an output torque.

FIG. 14 depicts an example diagram showing a test rig for measuring an output torque of the module 1100. As shown in FIG. 14, the test rig 1400 is built to allow an external force to be applied manually during the operation of the module 1100. The external force is measured with a small load cell logged at 50 Hz with a microcontroller, and synchronized with the measurements of the spring displacement and the motor current from the module 1100.

Figure 15:
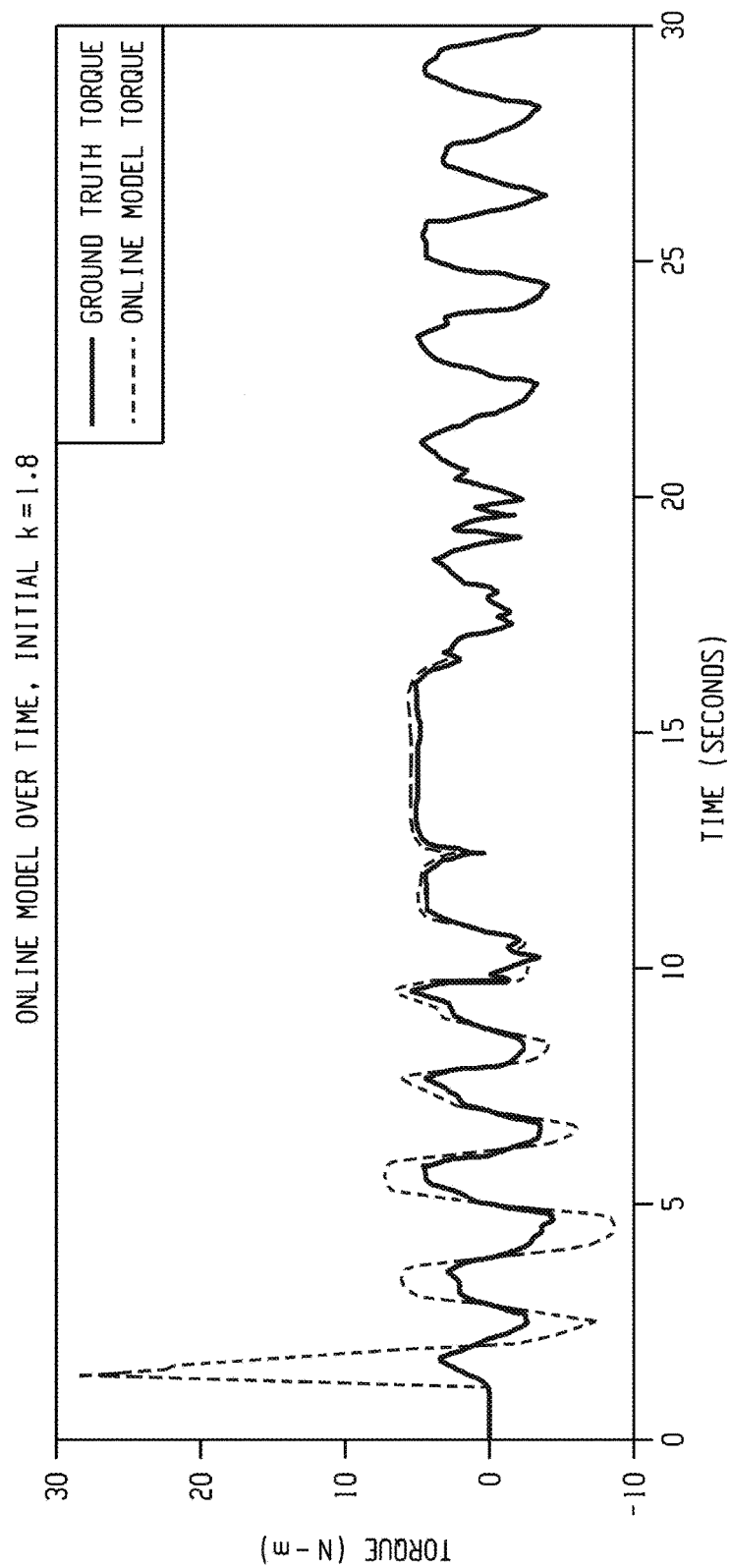
FIG. 15 depicts an example diagram showing an estimated torque based on the online calibration model compared to a measured output torque.
Figure 16:
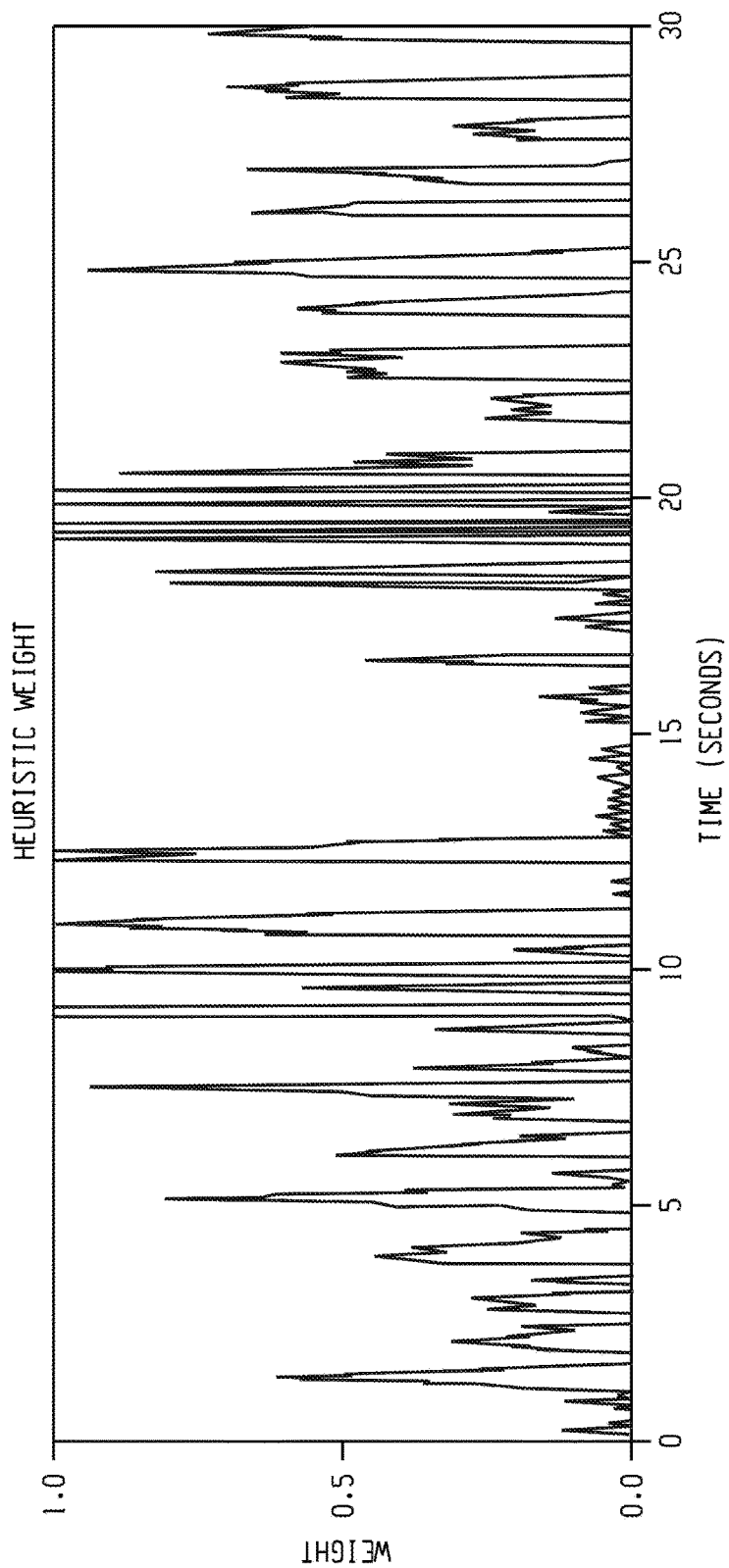
FIG. 16 depicts an example diagram showing a weighing factor for motor current measurements.
Figure 17:
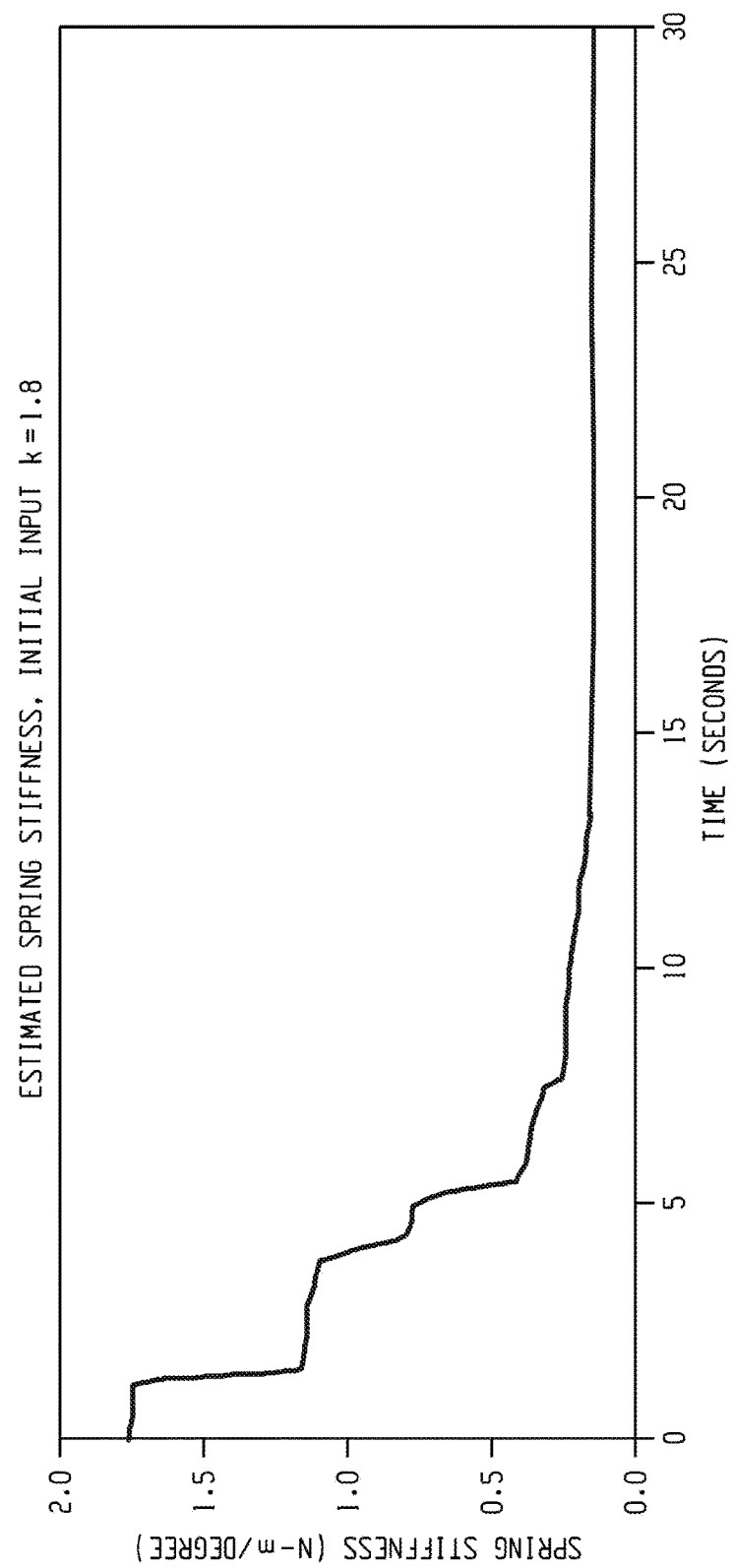
FIG. 17 depicts an example diagram showing an estimated spring constant over time with a poor initialization.

The above-noted online calibration model tracks torque accurately and converges quickly. Specifically, the online calibration model requires no previous knowledge of the elastic element 1202, and converges on a spring stiffness that is nearly as accurate as a best fit for a given data set. FIG. 15 depicts an example diagram showing an estimated torque based on the online calibration model compared to a measured output torque of the module 1100, given an initial spring constant that is off by a factor of 10. FIG. 16 depicts an example diagram showing the corresponding weighing factor for motor current measurements. FIG. 17 depicts an example diagram showing an estimated spring constant over time that illustrates convergence despite a poor initialization value. Thus, FIGS. 15-17 illustrate the convergence of the estimated torque and the estimated spring constant, even with a poor initial input of spring stiffness.

The SSUKF and/or other filter frameworks can also accommodate more complex models by expanding the state vector and measurement models. For instance, a viscous damping term with damping coefficient c is included to account for velocity dependent effects:

$$T = k\theta + c\dot{\theta} \quad (21)$$

Additionally, higher-order physical models, nonphysical models, and models that take into account environmental effects (e.g., temperature) can be applied.

In some embodiments, an estimator for determining the output torque of the module 1100 is included in the firmware of the module 1100, so that the estimator has access to motor current and spring deflections (e.g., at up to 1 kHz), and the module 1100 has an accurate a self-calibrated torque during operation.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. An actuator comprising:
a ring shaped first plate having an inner radius and an outer radius;
a ring shaped second plate having a same inner radius and outer radius as the first plate; and
an elastic element sandwiched between the first plate and the second plate, the elastic element in contact with the first plate and the second plate along a full span between the inner radius and the outer radius, the elastic element including a center portion and an edge portion, the center portion corresponding to a first thickness and the edge portion corresponding to a second thickness larger than the first thickness, the elastic element being shaped so that a first shear stress associated with the center portion is equal to a second shear stress associated with the edge portion.

2. The actuator of claim 1, wherein the elastic element is in contact with both the first plate and the second plate.

3. The actuator of claim 1, wherein the elastic element includes a rubber-based material.

4. The actuator of claim 1, wherein the elastic element is sheared torsionally about a central axis.

5. The actuator of claim 1, wherein a cross section of the elastic element corresponds to a conical taper.

6. The actuator of claim 1, wherein the elastic element increases linearly in thickness from the center portion to the edge portion.

7. The actuator of claim 1, wherein the elastic element is molded to the first plate and the second plate.

8. The actuator of claim 1, wherein the elastic element includes an inner radius and an outer radius, the inner radius being associated with a hole and the outer radius being associated with an outer edge of the elastic element.

9. The actuator of claim 1, wherein the elastic element corresponds to an linear spring within a torque range.

10. The actuator of claim 1, wherein:
the actuator is configured to generate a torque; and
the torque is estimated based at least in part on measurements of a current provided to the actuator.

11. The actuator of claim 10, wherein the current is measured when a spring displacement of the elastic element and a rate of change of the spring displacement are in a same direction and when an output velocity associated with the actuator exceeds a threshold.

12. The actuator of claim 10, wherein the estimation of the torque is performed using a recursive estimation technique.

13. The actuator of claim 1, further comprising:
a temperature sensor;
wherein:
the actuator is configured to generate a torque; and
the torque is estimated based at least in part on the temperature sensor.

14. The actuator of claim 1, further comprising:
an encoder;
wherein:
the actuator is configured to generate a torque; and
the torque is estimated based at least in part on the encoder.

15. The actuator of claim 1, wherein:
the actuator is configured to generate a torque; and
the torque is estimated based at least in part on measurements of a spring displacement of the elastic element.

16. A device comprising:
a first component including a first actuator; and
a second component connected to the first component;
wherein:
the first actuator includes a first elastic element sandwiched between a ring shaped first plate having an inner radius and an outer radius and a ring shaped second plate having a same inner radius and outer radius as the first plate, the first elastic element in contact with the first plate and the second plate along a full span between the inner radius and the outer radius; and
the first elastic element includes a first center portion and a first edge portion, the first center portion corresponding to a first thickness and the first edge portion corresponding to a second thickness larger than the first thickness, the first elastic element being shaped so that a first shear stress associated with the first center portion is equal to a second shear stress associated with the first edge portion.

17. The device of claim 16, wherein the first elastic element includes a rubber-based material.

18. The device of claim 16, wherein the first elastic element is sheared torsionally about a central axis.

19. The device of claim 16, wherein a cross section of the first elastic element corresponds to a conical taper.

20. The device of claim 16, wherein;
the second component includes a second actuator;
the second actuator includes a second elastic element; and
the second elastic element includes a second center portion and a second edge portion, the second center portion corresponding to a third thickness and the second edge portion corresponding to a fourth thickness larger than the third thickness, a third shear stress associated with the second center portion being equal to a fourth shear stress associated with the second edge portion.

21. A robot comprising:
a plurality of modules connected in series and including one or more actuators;
wherein:
the actuators are configured to receive a current for generating a torque for motion of the modules;
the actuators include an elastic element sandwiched between a ring shaped first plate having an inner radius and an outer radius and a ring shaped second plate having a same inner radius and outer radius as the first plate, the elastic element in contact with the first plate and the second plate along a full span between the inner radius and the outer radius; and
the elastic element includes a first center portion and a first edge portion, the first center portion corresponding to a first thickness and the first edge portion corresponding to a second thickness larger than the first thickness, the first elastic element being shaped so that a first shear stress associated with the first center portion is equal to a second shear stress associated with the first edge portion.

* * * * *